Jan. 18, 1944.   F. S. SMITH   2,339,736
APPARATUS FOR STERILIZING FLOUR AND LIKE PRODUCTS
Filed April 8, 1943   3 Sheets-Sheet 1

INVENTOR
Franklin S. Smith
BY
Blair, Curtis & Hayward
ATTORNEYS

Jan. 18, 1944.   F. S. SMITH   2,339,736
APPARATUS FOR STERILIZING FLOUR AND LIKE PRODUCTS
Filed April 8, 1943   3 Sheets-Sheet 2

INVENTOR
Franklin S. Smith
BY
Blair, Curtis + Hayward
ATTORNEYS

Jan. 18, 1944.   F. S. SMITH   2,339,736
APPARATUS FOR STERILIZING FLOUR AND LIKE PRODUCTS
Filed April 8, 1943   3 Sheets-Sheet 3

INVENTOR
Franklin S. Smith
BY
Blair, Curtis & Hayward
ATTORNEYS

Patented Jan. 18, 1944

2,339,736

UNITED STATES PATENT OFFICE 2,339,736

APPARATUS FOR STERILIZING FLOUR AND LIKE PRODUCTS

Franklin S. Smith, North Haven, Conn.

Application April 8, 1943, Serial No. 482,365

12 Claims. (Cl. 99—250)

This invention relates to an apparatus for sterilizing milled products in bulk, such as flour, and to a method and apparatus for regulating or controlling the flow of flour in such a sterilizing apparatus.

This application is a continuation-in-part of my copending application Serial No. 296,544, filed September 26, 1939.

One of the objects of this invention is to provide an apparatus for destroying, from milled food products, such as flour, insect infestation usually in the form of eggs, larvae, pupae or adults, that will be relatively inexpensive to build, capable of simple and rapid assembly, and of efficient and reliable action. Another object is to provide a sterilizing apparatus of the above-mentioned character in which the drive of rotating parts may be safely effected by the use of more common and less expensive forms of electric motors, and to provide a sterilizing apparatus embodying such a form of motor in a manner to avoid giving rise to determental or dangerous effects upon or conditions of the flour and to guard against or to minimize the exertion of harmful strains or destructive effects upon the apparatus. Another object is to provide an assembly and mounting of an electric motor and the flour-treating means so that the latter may be safely rotated at relatively high peripheral velocities and in a way to minimize or avoid detrimental or destructive strains or effects that might arise from unbalanced conditions created by the products undergoing treatment. Another object is to provide a simple, strong, durable and compact flour-treating apparatus capable of simple and rapid assembly and well adapted to transmit dependably and safely and to absorb or dissipate strains or forces which might be made effective when the products undergoing treatment at high peripheral velocities give rise to unbalanced conditions.

Another object is to provide, in a flour-sterilizing apparatus utilizing parts rotating at high peripheral velocities for effecting destruction of insect life, a simple and dependable control or regulation of the rate of flow of flour to be treated. Another object is to provide a dependable and inexpensive assemblage of a flour-treating element with a means for affecting the rate of flow of flour thereto. Another object is to provide a flour-sterilizing element for effecting the destruction or removal of insect infestation that will be relatively simple and inexpensive to construct; another object is to provide such an element with inexpensive and dependably acting means for feeding to it flour to be treated. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which is shown one of the various possible embodiments of the mechanical features of my invention.

Similar reference characters refer to similar parts throughout the several views of the drawings.

Figure 1:
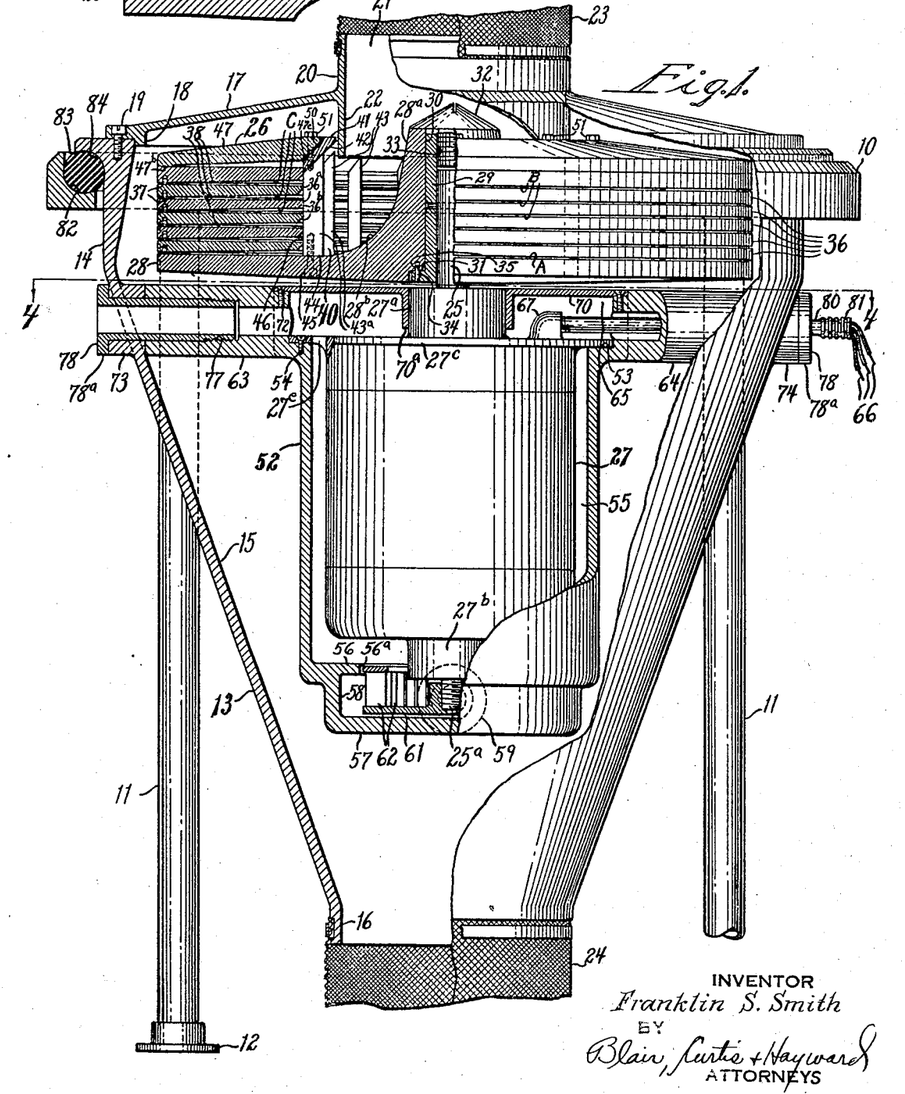
Figure 1 is a front elevation of the apparatus with certain of the parts broken away and other parts shown in central vertical section.
Figure 3:
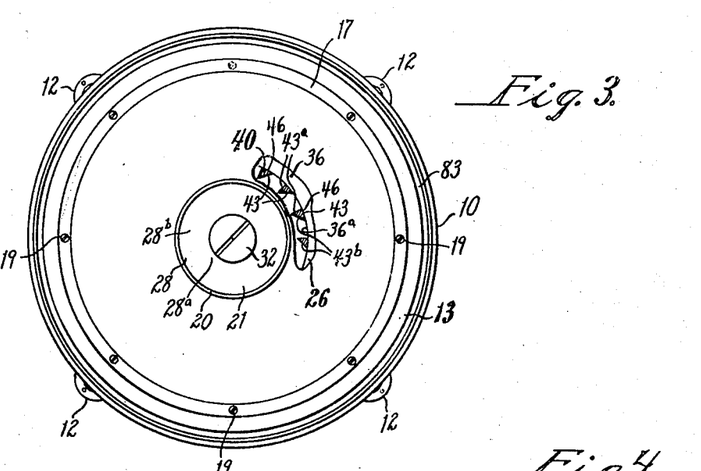
Figure 3 is a plan view as seen from the top in Figure 1, certain parts being broken away and certain other parts being shown in section.

Referring first to Figures 1 and 3, I preferably provide a main frame or main support preferably taking the part of an annulus 10 provided with suitable standards or legs 11, illustratively four in number, whereby the frame 10 may be supported from a floor or the like to which it may be secured as by the flanges 12 at the ends of the standards 11. By the frame 10 is supported, in a preferred manner later described, a casing-like structure generally indicated by the reference character 13 and preferably circular in cross-section, having preferably an upper cylindrical portion or section 14 and a lower portion 15 preferably substantially frusto-conical in shape, terminating at its lower end in a flanged outlet opening 16; the upper cylindrical portion 14 is closed over preferably by a substantially frusto-conical upper casing section 17 suitably flanged internally as at 18 to interfit with the portion 14 to which it is preferably detachably secured as by screws 19. Upper casing section 17 is provided with a cylindrical upward extension 20 providing an inlet opening 21 and it preferably also has a downward extension 22 for guiding incoming flour to the flour-treating element or unit. Inlet and outlet openings or passages 21 and 16 are conveniently and preferably alined along the vertical axis of the casing structure 13. Also, it is by the inlet passage 21 and outlet passage 16 that the apparatus may be interposed or connected at any suitable point into the usual production equipment or routine employed in the milling of flour, and in view of certain features latter described such connection is preferably made as by relatively short tubular lengths of conduit 23 and 24 preferably of any suitable flexible material, like cloth or fabric, having their respective ends secured in any suitable manner, as indicated in Figure 1.

Within a casing structure like the structure 13 above-described, I mount and make effective a flour-treating and insect life destroying or removing element or unit of the general type described in my copending application Serial No. 296,543, filed September 26, 1939, providing it with a suitably configured space or spaces into which the flour with its insect infestation is caused to flow at sufficient velocities, preferably achieved, as in the illustrative and preferred forms described in my said application, by causing the flour and its infestation to exert centrifugal forces sufficient to flow the flour through the space or spaces and to crush, squeeze or deform, and thus destroy the life in, the insect infestation, and hence, this element or unit, preferably built up, is mounted for rotation at a speed sufficient to give peripheral velocities adequate to give the desired magnitude of centrifugal forces. In my said copending application Serial No. 296,543, I pointed out that it is preferred to utilize, as, for example, in the conduit leading the flour to the inlet passage of the apparatus, any suitable or known means for controlling or regulating or varying the rate of feed of flour to the apparatus; I have, however, discovered that it is possible to eliminate the need of such an extraneous control device and, for a given peripheral velocity of the flour to achieve in effect a self-regulation or self-control of the rate of flow of flour into the above-mentioned configured space or spaces. And preferably I provide such regulation in a manner to counteract tendencies toward unbalance of the otherwise preferably dynamically balanced rotary device. Moreover, I am also enabled materially to simplify and make less expensive to construct a flour-treating element or unit of the above-mentioned type and to adapt it better for association with and drive by an ordinary and less expensive form of electric motor assembly.

Accordingly, and referring now to Figure 1, I preferably provide a driving shaft 25 arranged vertically and preferably coaxially with the casing structure 13 for supporting and driving the rotary flour-treating unit, which I have generally indicated by the reference character 26, the shaft 25 being preferably the shaft of any suitable type of electric motor, such as a polyphase alternating current induction motor of which only the casing is shown in Figure 1, being generally indicated by the reference character 27. The internal construction of this motor may take any usual or suitable form and usually comprises a suitable stationary field or stator structure suitably related to or carried internally of the casing 27 and a suitable rotor or armature structure carried by the internal portion of the shaft 25 which is rotatably carried by the casing 27 by any suitable form or bearings preferably mounted in the end extensions 27ª and 27ᵇ of the casing 27 and preferably including also a suitable thrust type of bearing to carry the downward thrust exerted by the shaft 25 and the parts carried by it. Motor casing 27 is mounted within the casing structure 13 in a preferred manner later described.

Flour-treating unit 26 preferably comprises a main disk-like carrier plate 28 suitably shaped at its center to form a hub 28ª of appropriate axial extent, hub 28ª being bored out as at 30 for interfitting with a sleeve 29 which is pinned to shaft 25 and to which it is secured so as to be driven thereby. Preferably the sleeve 29 is stepped or shouldered, as at 31, against which the hub 28ª is clamped as by a screw 32 threaded into a threaded hole 33 in the end of the sleeve 29. The shoulder 31 may be provided with one or more pins 34 that take into suitable holes 35 in the lower face of the hub 28ª thus to insure a positive driving connection between the shaft and the hub.

Figure 6:
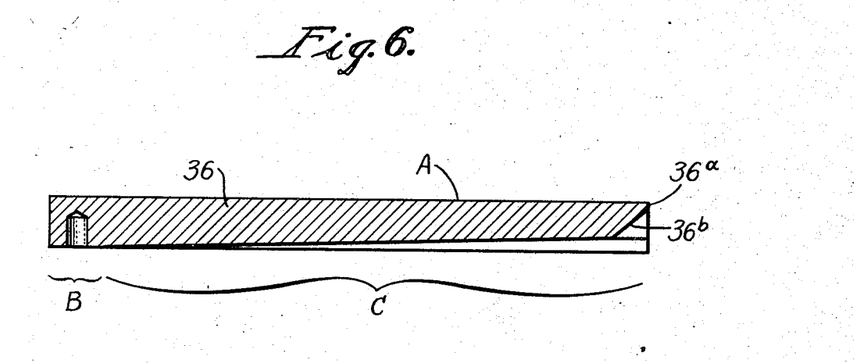
Figure 6 is an enlarged fragmentary sectional view of some of the parts shown in Figures 1 and 2.

As in my above-mentioned application, I preferably provide several suitably configured spaces in which the destruction of insect life takes place and these I prefer to form by interrelating with the carrier plate 28 one or more annular members 36 shaped to present adjacent faces to form between them spaces of the desired dimensions and configuration. Thus, the upper faces A of carrier plate 28 and of the annular plates 36 may be plane and at right angles to the axis of rotation of shaft 25, while as best seen in Figure 6 the lower or under surfaces of the annular plates 36 may have outer or marginal portions or faces B also plane and at right angles to the axis of rotation merging into or connected with faces C that are substantially frusto-conical. Suitable means such as spacers 37, peripherally spaced, preferably interposed between faces B and A fix the spacing between the latter, making it on the order of 0.006 inch, while the angle subtended between faces A and C is illustratively on the order of 1°. The radial dimensions of the parallel-walled space between faces A and B may be on the order of ½ inch while the radial dimension of faces C may be on the order of 5 inches, where the outside diameter of the members 28 and 36 is on the order of 23 inches. In this illustrative way, spaces in the form of annular slots 38 may be provided, each having an outlet or discharge end in and extending about the periphery of the built-up unit 26 and an inlet end of smaller radius than the outlet end.

It is along such converging spaces or slots 38 that the flour and insect infestation is moved with sufficient velocity to flow the flour therethrough and out of the discharge or outlet ends and to cause the infestation, in whatever stage it is present, to become squeezed or deformed or compressed, and its life destroyed, in the narrower or narrowest portions of the converging spaces. As pointed out in my above-mentioned copending application Serial No. 296,543, these spaces may take various forms and the dimensions may be varied according to circumstances. For example, the thickness of the restricted portion of the spaces or slots 38, namely the spacing between the parallel faces B and A, is preferably made as small as is practicable with due consideration of the type of flour and the kind of insect life or insect infestation met with in the flour, and the above-mentioned dimension of 0.006 inch, is selected in view of the fact that the flat grain beetle is the smallest beetle common in flour and in its smallest stage of life, a newly hatched larva, it will not pass through this thickness of space without destruction of its life.

Figure 2:
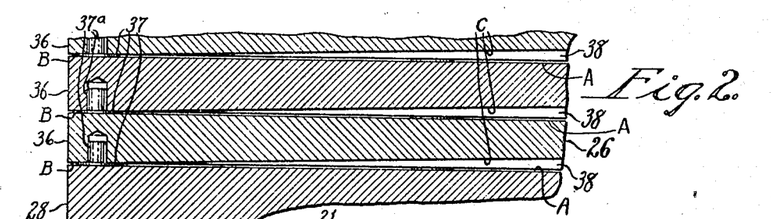
Figure 2 is a fragmentary view on an enlarged scale of a portion of certain of the parts shown in Figure 1.

The spacers 37, preferably equiangularly spaced on the same radius so as to avoid unbalance may take any suitable form and illustratively and preferably and as is better shown in Figure 2, they comprise a disk-like spacer part of the thickness to give the desired spacing provided with or having integrally formed therewith a shank or stud-like portion 37ª which is fitted into a suitable hole, preferably as by a press fit, drilled or otherwise formed in the under face of each annular plate 36. The spacers 37 may thus be assembled or secured to each plate member 36 and when a suitable number, as illustrated in Figure 1, are concentrically stacked one upon another, the desired spacings are thus achieved.

Figure 5:
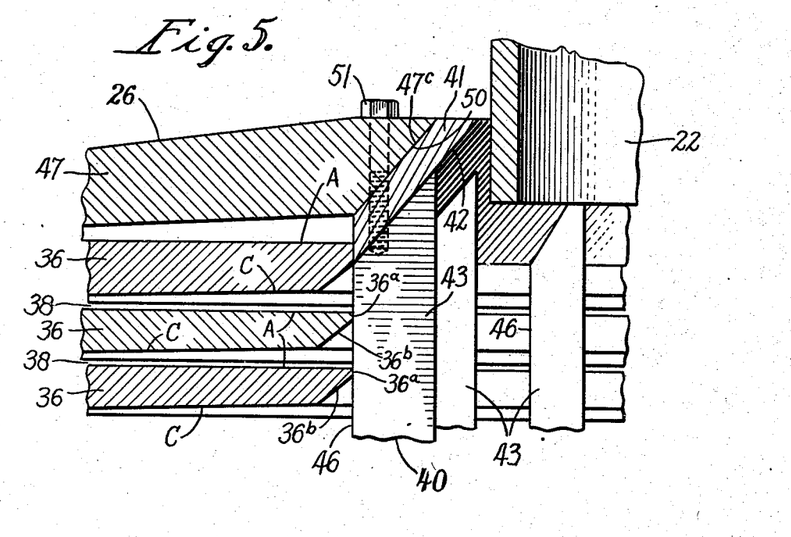
Figure 5 is an enlarged fragmentary sectional view of some of the parts shown in Figure 1.

Concentricity of assembly of plate members 36 relative to each other and to the carrier plate 28 is preferably achieved by utilizing a part generally indicated by the reference character 40 and which preferably is constructed also to function as a control of the rate at which flour is entered into the inner annular open ends of the spaces or slots 38. In an illustrative and preferred form as best seen in Figures 1 and 5, the member 40 comprises an annular portion 41 having an internal frusto-conical face 42 from the lower portion of which depends a suitable number of equiangularly spaced vertically extending parts 43 and preferably integrally formed therewith. The lower or under faces 44 of the parts 43 contact an inward extension of the face A of carrier plate 28 and where the latter is at right angles to the axis of rotation, the faces 44 lie in a plane at right angles to the axis of the annulus 42. The member 40 is secured to the carrier plate 28 so that the axes of the two are coincident and for this purpose screws 45 extending through the carrier plate 28 from the under face thereof and threaded into a suitable number of equiangularly spaced parts 43 may be used.

The outer faces 46 (Figure 5) of the spaced depending parts 43 fall in a cylinder whose axis is coincident with the axis of the member 40 (Figure 1) and hence with the axis of rotation of the carrier plate 28. The inner edges of the annular plates 36 that are superimposed upon the carrier plate 28 and upon each other are machined or shaped to provide a cylindrical edge face 36ª of but slightly greater radius than that of the faces 46 so that the plates 36 are in effect strung onto the parts 43 with a sufficiently snug fit to insure absence of appreciable play and hence coincidence of the axis of plate 36 with each other and with the axis of carrier plate 28.

With member 40 related to the carrier plate 28, as by the screws 45, and with the annular members 36 superimposed as above described and concentrically positioned by the outer faces of the member 40, an annular clamping plate 47, shaped preferably as shown in Figures 1 and 2 is now related to the assemblage. Member 47 is shaped so that it engages the uppermost plate member 36 throughout an outer marginal portion of its upper face, having an annular face 47ᵇ adjacent its periphery to contact the uppermost plate 36 in an annular region of the latter above the equiangularly spaced spacers 37. An inner frusto-conical face 47ᶜ of the member 47 overlies the outer frusto-conical face 50 of the annular portion 41 of member 40; suitable connection is made between the member 47 and the member 40 whereby the former may be drawn or pressed in a downward direction, thus to clamp the annular plate members 36 with their interposed spacers 37 between the carrier plate 28 and the annular clamping plate 47; for this purpose equiangularly spaced screws 51 (Figures 1 and 5) may be used. Screws 51 pass through suitable holes in the member 47, being threaded into holes in the member 40 that pass through the annular portion 41 thereof and into underlying depending parts 43. The parts 28, 36 and 47 are preferably made of a strong, tough metal, illustratively and preferably stainless steel.

Where the flour-treating unit 26 is to rotate counterclockwise, when viewed in Figure 3 or as seen from above in Figure 1, the members 43, which will be seen from Figure 3 to be equiangularly spaced across the inner or inlet ends of the spaces or slots 38, are preferably provided with leading and trailing faces 43ª and 43ᵇ shaped and related to each other, illustratively as shown in the drawings, to act to guide or impel, when the unit 26 is rotating at suitable velocity, the flour with its insect infestation through the orifice-like spaces between successive members 43 and into the inlet ends of the spaces 38, these actions being, if desired aided by a similar impeller action upon air entrained in the flour or air that is otherwise available by way of the space within the annular member 40. For these purposes the faces 43ª of the members 43 may be plane and may lie along a radius to the axis of rotation, while faces 43ᵇ slant at an angle, as indicated in Figure 3, away from the direction of rotation. With such relative angularities, flour will not adhere to or pack onto these surfaces. Limitation of the rate of flow of flour into the slots 38 is effected by the surfaces 46 of the members 43 closing part of the slot entrances.

Flour may enter the apparatus through the inlet passage 21 (Figure 1) at a varying rate; dropping downwardly it strikes the upper curved face 28ᵇ of the hub 28ª and the shape of that face, preferably in the form of a tractrix, aided by the peripheral velocities of points on its surface, increasing with the radius, effects a more or less uniform distribution of the incoming flour in the torous-like space between the hub 28ª and the member 40. The flour particles and the insect infestation are thus set into rotation at peripheral velocities which increase as their radial distances from the axis of rotation increase, whence they exert centrifugal forces which cause them to move into the circularly distributed orifice-like openings or entrances between adjacent faces of successive parts 43 of the member 40. The parts 43, however, are also moving at substantial peripheral velocities and the innermost edge portions of the leading faces 43ª in effect pick up or catch up, from the outwardly moving product in the above-mentioned torous-shaped space, in rapid succession relatively small quantities or increments and though there may be a non-uniform distribution of the product in the torous-shaped space, the equally spaced parts 43, by an action like that just described, effect a substantially uniform distribution of moving flour particles and insect infestation into and throughout, and also regulating limitation of the amount thereof into the orifice-like spaces therebetween and into the inner annular inlet ends of the spaces 38, the above-mentioned cylindrical face 36ª of the members 36 being preferably of relatively short axial dimension and this may be achieved by beveling off the members 36 to provide inclined or frusto-conical faces 36ᵇ which make an angle to the direction of outward flow of flour such that the latter will not adhere to the face 36ᵇ or pack up onto it. An angle less than about 50° is preferred for this purpose. The under frusto-conical face 42 of the member 41 is preferably also at a similar angle so that it together with those portions of it that extend between the depending parts 43 will act to deflect the flour without retention of any flour against itself. As shown in Figure 1, this frusto-conical under face 42 preferably terminates in its lower edge or at below the inner upper edge of the inclined face 36ᵇ of the uppermost member 36.

In addition to the distributing action of the parts 43 described above, these parts cut the flowing stream of product as it is discharged outwardly toward the spaces 38 and consequently impact the insect life during this early stage of its passage through the treating device 26. This impacting action, carried out mainly by the surfaces 43ᵃ of the parts 43, is of sufficient intensity to kill at least all stages of insect life in the product which are too large to pass into the openings of the slots 38.

The flour with its insect infestation is caused to exert sufficient centrifugal force to move it into the outwardly converging or alternately restricted spaces or slots 38. With the above-stated illustrative dimensions of the parts and assuming a speed of drive of the unit 26 of 3450 R. P. M., a speed commensurate with the characteristics of the motor, where it is given the form of a two-pole 60-cycle induction motor, the centrifugal forces exerted in the inlet ends of the spaces or slots 38 is on the order of 2200 times gravity and on the order of 4000 times gravity at the peripheral exit ends thereof. The flour is thus flowed into and through the spaces, being peripherally discharged; the insect infestation, in whatever stages it is present, is likewise flowed into the spaces 38 but upon reaching an appropriately restricted portion of the space or spaces, the centrifugal force exerted thereby effects a deformation, crushing or compression of the stage of insect infestation sufficient to destroy its life. The destroyed stage of insect infestation becomes entrapped in the restricted or narrower or narrowest portion of the space or slot. It may or may not be retained in the unit 26, depending upon various factors such as the kind and stage of insect life destroyed and upon the quantity of flour passed through before the spaces are cleaned. It is usual flour mill practice to mill continuously for six days and hence it will be seen that dead and entrapped infestation can become dry and considerably worn away by attrition of the flowing flour.

With a substantially uniform regulation of the entry of flour into the inlet ends of the spaces or slots 38 and a uniform distribution by the elements 43 of flowing flour into the inlet ends, the peripherally exposed outlet ends of the spaces 38 substantially uniformly discharge flour substantially tangentially against the inner face of the cylindrical portion 14 (Figure 1) of the casing structure 13 by which it is downwardly deflected, entering the frusto-conical casing portion 15 with a sort of swirling motion, dropping ultimately through the discharge passage 16 and thus out of the apparatus.

As previously noted, this machine is designed to process a continuously flowing stream of bulk product such as flour entering through the inlet 21, flowing without stoppage through the treating unit 26, thence flowing downwardly and outwardly through the outlet 16. It is essential in a machine of this character that there be no stoppage of the product flow through the machine and accordingly all surfaces, other than the surface of the hub 28ᵃ with which the product comes in contact, must be at an angle greater than the angle of repose of the product for such surfaces. More specifically, the smaller angle between the inner peripheral surface 42 of the member 40 and the axis of the rotor 26, and the smaller angle between the inner peripheral surfaces 36ᵇ of the plates 36 and the same axis are greater than the angle of repose of the product to be treated. Also the angle between surface 43ᵇ and a line at right angles to surface 43ᵃ is greater than the angle of repose of the product to be treated. Where such product is flour, the average angle of repose is 37° for smooth metal surfaces such as those here in question. Consequently, the above mentioned angles should always be some angle greater than 37°.

As shown in Figure 1, surfaces 43ᵃ and 43ᵇ are vertical and hence when the machine is at rest any flour entering the machine would first fall away from these surfaces and pile up down at the base 28ᵇ of the hub. However, the machine is built for continuous operation over extensive periods of time and when so operated, the flour flows horizontally from the axis of the rotor passing the surfaces 43ᵃ and 43ᵇ with a force upwards of 2000 times gravity. Thus, any tendency of the flour to accelerate downwardly due to the earth's attraction would be negligible in comparison to the large forces exerted in an outward or horizontal direction. Accordingly, if the machine is designed for processing flour and if the angle between the surface 43ᵇ and a line drawn at right angles to the surface 43ᵃ is less than the angle of repose of the product being treated, the flour will build up on this surface during the operation of the machine and this in spite of the fact that these surfaces are vertical. The elimination of any surfaces where the product being treated has a tendency to adhere is important for here insects may remain alive during operation of the machine to later crawl into the product when the machine is stopped.

Where the motor that drives the flour-treating unit 26 is particularly of the less expensive form or type above-mentioned, heat losses within the motor could occasion substantial temperature rises, particularly under long continued operation, and with the casing 27 stationary, and thus exposed for the deposit thereon of discharged flour, conditions either unsafe or detrimental to the flour that swirls downwardly in the casing portion 15 might arise. Accordingly, I prefer to provide the motor or motor casing 27 with means to prevent any such action from taking place.

Preferably, motor casing 27 is provided with an end flange 27ᶜ that projects peripherally from the casing for supporting the motor from and within a cylindrical housing 52 which is preferably in the form of a casting and is internally shouldered or rabbetted, as at 53, to receive the motor casing flange 27ᶜ which is secured as by screws 54. Housing 52 is of an internal diameter greater than the diameter of motor casing 27 to leave an annular space 55 therebetween, the flange 27ᶜ being apertured as at 27ᵉ at suitable intervals so as not to close off the space 55.

The lower end of housing 52 is shaped to provide in effect a blower casing formed by two spaced walls 56 and 57 and a suitably curved or configured side wall 58 which has cast into it two tube-like outlets 59 and 60 (see Figure 4) and, if desired, the shaping or curvature of the wall 58 may approximate two semi-involute curves to give a better tangential relation of the outlet tube members 59 and 60 through which, as later described, air is to be discharged by a blower or air impeller 61 (Figure 1) preferably mounted on a lower extension 25ª of the motor shaft 25, the upper wall 56 having a suitable aperture 56ª for the passage therethrough of the impeller structure 61, the impeller blades 62 of which terminate at their upper ends preferably in the plane of the aperture 56ª so that upon counterclockwise rotation, as above noted, of the shaft 25, the impeller 61 draws air downwardly through the annular jacket space 55 into the impeller housing 56—58—57 for discharge through the outlet members 59 and 60.

The upper end of the housing 52 is provided, as by having cast integrally therewith, with two tube-like extensions 63, 64 which open into the space within the housing 55 at preferably diametrically opposed points above the plane of the end flange 27ᶜ of the motor casing, while the upper end of the housing 52 has a round opening 65 therein large enough to permit the motor casing 27 with flange 27ᶜ to be passed therethrough downwardly and into the housing 52 for assembly to the latter as by the screws 54 as above described. In thus assembling the motor to the housing 52 the motor conductors or lead wires 66 are preferably brought out of the motor casing 27 through a tube-like fixture 67 mounted in the upper end of the casing 27 and provided with a threaded hole, these parts being positioned so that upon the assembly of the motor to the housing the threaded opening is in line with the tube-like extnesion 64. The lead wires 66 are temporarily pulled through opening 65 in housing 52 and the motor sub-assembly may now be let down into the casing section 15.

Figure 4:
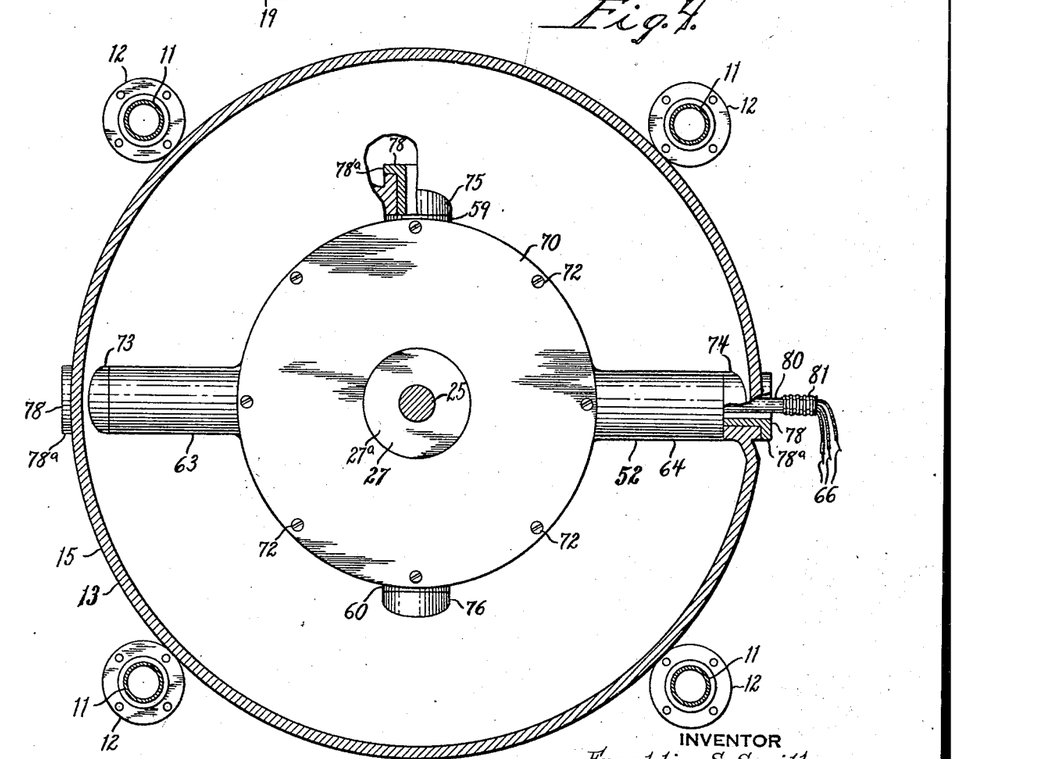
Figure 4 is a horizontal sectional view as seen along the line 4—4 of Figure 1.

Casing section 15 is provided, as by casting integrally therewith, with two pairs of opposed tube-like bosses, such as an upper pair 73 and 74 diametrically opposed like the upper pair of tube-like extensions 63 and 64 of the housing 52 and having their internal juxtaposed faces spaced apart by the distance of the end faces of the parts 63 and 64, and such as a lower pair 75 and 76, similarly diametrically opposed as are the outlet tubular extensions 59 and 60 at the lower end of the housing 52, end faces of the tubular bosses 75 and 76 being faced off to mate with the end faces of the tube-like extensions 59 and 76, respectively. Preferably, the pairs of housing extensions 63—64 and 59—60 are on diameters which, when viewed along the axis, as in Figure 4, are at right angles to each other, and, of course, the casing bosses above-mentioned are similarly distributed.

Each of the tubular extensions 59—60 and 63—64 is internally threaded, as at 77, so that each may receive the threaded end of a sleeve member 78 that is passed through the casing boss and into its mating housing extension, the threaded sleeve member 78 being externally flanged, as at 78ª, where it may also be appropriately recessed to receive a tool like a spanner wrench, whereby the respective housing extensions and casing bosses are brought into alinement and mechanically and securely fastened together, the sleeve members 78 leaving the corresponding passageways substantially unobstructed. Thus, a strong and rigid mounting of the motor and flour-treating unit to the casing structure 13 is assured.

The lead wires 66 of the motor are, in the course of this assembly, redrawn downwardly through opening 65 and thence through tubular part 64, then drawn through the casing boss 74 with which the tubular housing extension 64 becomes alined, whence a section of conduit or pipe 80 is sleeved over the lead wires 66 and its threaded end is threaded into the threaded opening 68 of the fixture 67, the conduit 80 being of sufficient length to extend appropriately beyond the outer end of the hollow boss 74 to permit suitable extension of the electric circuit as by a flexible conduit 81 to a junction box, thence to a suitable control (not shown) such as a switch connecting the power circuit. Cover plate 70 is next fitted into a rabbet 71 at the upper peripheral end of the housing 52 and sleeved as at 70ª to take over the casing extension or bearing housing 27ª is put in place and secured as by screws 72. Thence the flour-treating unit 26 may be assembled to the shaft 25 in the manner above described and with the top casing section 17 removed.

The upper casing section 17 is now replaced. During the operation of the apparatus, the air impeller 61 maintains a steady flow of air inwardly through the mounting bosses 73, 74, by way of the tubular connectors 78, thence into thermal contact with the motor casing 27, passing downwardly through the flange apertures 27ᵉ and into the impeller casing by way of the end wall aperture 56ª, thus abstracting sufficient of the heat losses to maintain the motor at suitable operating temperature and to prevent the housing 52, to which the downwardly falling or swirling flour in the casing portion 15 is now exposed, from reaching a temperature that might harm any flour that might become deposited on the housing 52 or from giving rise to otherwise detrimental or possibly dangerous conditions; it will be noted that the air thus brought in for these purposes originates externally of the apparatus, being also discharged externally thereof by way of the discharge passages 59—75 and 60—70.

The frame 10, in the preferred form of an annulus, as above described, is shaped, as at 82, to provide a preferably continuous seat for a resilient or cushioning member 83, preferably of rubber, while the outer peripheral end of the casing portion 15 is flanged or shaped to provide a seat 84 preferably of an extent throughout the periphery for engagement with the rubber element 83 which thus becomes interposed between the two seats when the casing portion 14—15 is assembled to the frame 10 as by letting the former down into the latter.

The resilient rubber element 83 may be made of any suitable cross-section, illustratively circular and preferably the seats 82, 84 are of commensurate or similar shape.

In the operation of the apparatus, though all of the rotating parts are constructed and assembled or otherwise dynamically balanced, conditions of unbalance might arise as, for example, by entrapped forms or stages of insect infestation in the flour-treating element or unit 26, together with such quantities of flour as may be blocked by such entrapped stages of insect life. The resilient connection between the casing structure 13 and the supporting frame 10 falls in a plane which is at or slightly above the center of gravity of the rotating parts and accordingly as unbalance of the unit 26 takes place, the yieldability of the member 83 permits such a shifting of the axis of the entire apparatus thus supported from the frame 10 as corresponds to a precessional motion, limited by the resilience of the member 83, effected by the unbalanced rotation mass. This precession is stable since the center of gravity of the rotating parts is coincident with or slightly below the plane of the effective support provided by the resilient member 83 and its yieldability and resilience not only tend to prevent the transmission of vibration to the frame structure but also by the friction or resistance of the resilient rubber element 83 retards the precession and ultimately completely negatives it, restoring the rotating mass to a position with its axis in normal position. The resilient mounting permits the rotating members and the load to assume, as a center of gyration, the center of gravity of the rotating mass, and its load. The forces that bring about the above-described precessional motion, being exerted principally by the flour-treating unit 26, are by the above-described construction effectively transmitted, as by the mechanical connections of the motor mounting to the casing section 15, and by the latter are transmitted to the resilient member 83 where they are resisted, opposed and negatived, as above described; this transmission will be seen to take place through structural elements coacting in a way to negative or prevent the possibility of overstraining any part of the apparatus.

As above described, the parts 43 of the member 40, in the preferred form, effect a substantially uniform distribution of the flour and insect infestation into the treatment slots or spaces and also preferably act to limit or regulate the amount of product entered into these slots or spaces; with such a preferred arrangement and functioning, tendencies to unbalance the rotating mass by uneven loading or charging of the treatment space or spaces are avoided or opposed and, where the treatment space or spaces are substantially uniformly distributed about the axis of rotation, each operates at substantially uniform efficiency throughout the extent of the uniform distribution about the axis of rotation; thus, these preferably coact with the above-described preferred arrangement for permitting precessional motion, toward opposing or correcting unbalance.

As precessional motion or shifting of the axis, even though of limited conical extent, takes place, such shifting, including a corresponding shifting of the entire casing structure, is permitted to take place without disturbing related apparatus or conduits connected to the apparatus, due to the flexibility of the connecting tubes 23 and 24, and of the wires 66 and flexible metallic tube 81, as earlier above described. The latter also prevent the transmission of any possible vibration to parts connected thereby.

Access to the interior of the apparatus is easily gained. Thus, casing section 17 may be readily removed and flour-treating unit 26 may be readily removed from the shaft sleeve 29, as, for example, for purposes of cleaning. Illustratively, for such a purpose, the various plates 36 may be easily separated from each other or removed, thus to expose their various faces that form the treatment spaces and this may be readily accomplished by removing the annular clamping plate 47, whence the plates 36 may be lifted off of each other and from the carrier plate 28.

Thus, it will be seen that there has been provided in this invention a method and apparatus in which the various objects hereinbefore noted, as well as many thoroughly practical advantages are successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In apparatus for effecting the destruction of all insect life in a flowable product composed of individual solid parts, the combination of a rotatable plate member, an annular plate member supported above said rotatable plate member thereby providing a central opening for the reception of the product and a treatment zone between said members, and a plurality of parts bridging the space between said members at the inner periphery of said annular member, the surfaces between said members being effective to engage and thereby inflict lethal trauma on all of the insect life in said product upon rotation of said rotatable member.

2. In apparatus for effecting the destruction of all insect life in a flowable product composed of individual solid parts, the combination of a rotatable plate member, an annular plate member supported above said rotatable plate member thereby providing a central opening for the reception of the product and a treatment zone between said members, and a plurality of parts bridging the space between said members at the inner periphery of said annular member, the leading surface of said parts being on radii of said rotatable member, the surfaces between said members being effective to engage and thereby inflict lethal trauma on all of the insect life in said product upon rotation of said rotatable member.

3. In apparatus for effecting the destruction of all insect life in a flowable product composed of individual solid parts, the combination of a rotatable plate member, an annular plate member supported above said rotatable plate member thereby providing a central opening for the reception of the product and a treatment zone between said members, and a plurality of parts bridging the space between said members at the inner periphery of said annular member, the trailing surface of said parts being at an angle which is greater than the angle of repose of said product, the surfaces between said members being effective to engage and thereby inflict lethal trauma on all of the insect life in said product upon rotation of said rotatable member.

4. Apparatus as described in claim 1, which includes means to rotate said rotatable member and a stationary central chute with its mouth disposed to direct the product into said central opening.

5. In apparatus for effecting the destruction of all insect life in a flowable product composed of individual solid parts, comprising a rotatable treating device including a bottom portion and an annular top portion with a central opening, means for rotating said device, means forming mutilating treating surfaces between said bottom and top portion, and a cage-like member having a plurality of substantially vertical bars bridging the space between said portions at the periphery of said opening whereby rotation of said device engages all insect life in the product flowing through said device to inflict lethal trauma thereon.

6. In apparatus for effecting the destruction of all insect life in a flowable product composed of individual solid parts, comprising a rotatable treating device including a bottom portion and an annular top portion with a central opening, means for rotating said device, a plurality of annular superimposed plate members disposed between said portions and providing annular slots in said device through which the product is directed upon rotation of said device, and a plurality of substantially vertical parts bridging the space between said portions at the periphery of the central opening in said top portion whereby all insect life in the product flowing through said device is engaged to inflict lethal trauma thereon.

7. In apparatus for effecting the destruction of all insect life in a flowable product composed of individual solid parts, comprising a rotatable treating device including a bottom portion and an annular top portion with a central opening, means for rotating said device, a plurality of annular superimposed plate members disposed between said portions and providing annular slots in said device through which the product is directed upon rotation of said device, and a plurality of substantially vertical parts bridging the space between said portions at the periphery of the central opening in said top portion, said slots converging from the periphery of said central opening to the periphery of said treating device and the smallest dimension of said slots being smaller than any form of insect life in said product but larger than the individual particles of said product whereby upon rotation of said device said parts engage and destroy all insect life too large to enter said slots and the surfaces of said slots engage and destroy all insect life passing therethrough.

8. In apparatus for effecting the destruction of all insect life in a flowable product composed of individual solid parts, comprising a rotatable treating device including a bottom portion and an annular top portion with a central opening, means for rotating said device, and means forming mutilating treating surfaces between said bottom and top portions, all of the surfaces of said device spaced from the axis of rotation and opposing the flow of said product being at angles which are greater than the angle of repose of the product being treated.

9. In apparatus for effecting the destruction of all insect life in a flowable product composed of individual solid parts, comprising a rotatable treating device including a bottom portion and an annular top portion with a central opening, means for rotating said device, and means forming mutilating treating surfaces between said bottom and top portions, all of the surfaces of the parts in the vicinity of the periphery of said central opening being shaped so that the smallest angle between said surfaces and the axis of rotation is greater than the angle of repose of the product being treated.

10. In apparatus for effecting the destruction of all insect life in a flowable product composed of individual solid parts, the combination of, confining means constituting a product-confining space through which a stream of the product is continuously passed in a free-flowing stream and a portion of which space defines the treatment zone, a rotary treating device mounted on a vertical axis and having treating surfaces for engagement with the particles of insect life and effective within said treatment zone to inflict lethal trauma on all insect life in the product, an electric motor positioned beneath said treating device and attached thereto for rotation thereof, a casing construction surrounding said rotary treating device and said motor and having a central product inlet at the top thereof through which the product is directed to said treating device and having a downwardly extending product-receiving portion into which the product falls from said treating device, a shell within said casing construction and surrounding said motor to provide an air space about said motor, a first pair of diametrically positioned supporting pipes on a line extending through the axis of rotation and extending between said shell and the respective sides of said casing construction, a second pair of diametrically positioned supporting pipes positioned on a line extending through the axis of rotation and at right angles to said first pair of supporting pipes and extending between said shell and the respective sides of said casing construction, and means to circulate cooling air through said shell by drawing air in one of said pipes and discharging the air through another of said pipes.

11. In apparatus for effecting the destruction of all insect life in a flowable product composed of individual solid parts, the combination of, a rotary treating device having a hub portion and a radially extending portion, said radially extending portion including a pair of spaced plates having opposed coextensive surfaces and a plurality of intermediate plates positioned therebetween, each of said intermediate plates having at the periphery thereof a plurality of spaced recesses and there extending into each recess a separate projecting member rigidly mounted upon the plate adjacent thereto to thereby provide a rigid aligning means between each of said intermediate plates and the adjacent plate, said treating device including means to hold said pair of spaced plates in rigid relationship to thereby provide a treating space confined to the dimensions of said treating device and having an inlet forming a substantially unrestricted passageway to allow a substantially even stream of said product to flow freely to said treating space, the smallest dimension of said treating space being larger than the maximum dimension of the individual parts of said product, means to feed said product to said inlet so that it may flow through said treating space, and means to rotate said treating device at a high speed to provide a life-destroying engagement between every individual particle of insect life and said treating device during passage of said product through said treating space.

12. In apparatus for effecting the destruction of all insect life in a flowable product composed of individual solid parts, the combination of, confining means constituting a product-confining space through which a stream of the product is continuously passed in a free-flowing stream and a portion of which space defines the treatment zone, a rotary treating device effective within said treatment zone and having treating surfaces for engagement with the particles of insect life and effective to inflict lethal trauma on all insect life in said product, an electric motor to rotate said treating device, a frame construction constituting a mounting means for said treating device and said motor and having rigid therewith a casing construction extending over the top and along the sides of said treating device and defining a space about said treating device through which the stream of the product may fall after being treated, and from which it is withdrawn, a peripheral flange extending from said frame construction and providing a supporting flange therefor, a supporting ring positioned beneath said peripheral flange and spaced therefrom, and resilient spacing means resting upon said supporting ring and occupying the space between said supporting ring and said annular flange to thereby provide for the resilient support upon said supporting ring of said frame construction and the apparatus supported thereby.

FRANKLIN S. SMITH.